United States Patent [19]

Cameron

[11] Patent Number: 4,858,742
[45] Date of Patent: Aug. 22, 1989

[54] CLUTCH DISK WITH CUSHIONED FRICTION ELEMENT ASSEMBLY

[75] Inventor: Mickey G. Cameron, Auburn, Ind.

[73] Assignee: Dana Corproation, Toledo, Ohio

[21] Appl. No.: 193,853

[22] Filed: May 13, 1988

[51] Int. Cl.⁴ .......................................... F16D 13/69
[52] U.S. Cl. .............................. 192/107 C; 192/107 R
[58] Field of Search ....................... 192/107 C, 107 R

[56] References Cited

U.S. PATENT DOCUMENTS

| | | | |
|---|---|---|---|
| 1,754,233 | 4/1930 | Fisher | 192/107 R |
| 1,868,543 | 7/1932 | Salzman | 192/107 |
| 1,913,802 | 11/1931 | Gregory | 192/107 R |
| 1,956,828 | 3/1931 | Fink | 192/107 |
| 2,015,890 | 10/1935 | Gottschalk | 192/107 R |
| 2,053,622 | 9/1936 | Manning . | |
| 3,064,782 | 11/1962 | Dubois | 192/107 R |
| 3,164,236 | 1/1905 | Bynes et al. | 192/107 |
| 3,452,844 | 7/1969 | Lallemant | 192/107 R |
| 3,857,469 | 12/1974 | Stimson | 192/107 R |
| 4,260,048 | 4/1981 | Beuoris | 192/107 C |
| 4,375,254 | 3/1983 | Lech, Jr. | 192/107 C |
| 4,377,225 | 3/1983 | Lech, Jr. et al. | 192/107 C |

Primary Examiner—Leslie A. Braun
Assistant Examiner—Nicholas Whitelaw
Attorney, Agent, or Firm—F. B. McDonald

[57] ABSTRACT

A clutch disk for use in a dry friction clutch includes a cushioned friction element assembly. The assembly includes a novel support system, wherein as part of a pair of identical friction laminates welded or otherwise secured to one another, opposing pairs of integral sliding wedge supports are adapted to jointly clasp the disk at radial boundaries of openings in the disk. In a preferred form, each laminate incorporates a backing plate, and each friction assembly includes a central cushion region between back plates. The sliding wedge supports retain each assembly over a disk opening, and are adapted to accommodate significant lateral deflection of the assembly during transitional engagement of the clutch disk.

12 Claims, 2 Drawing Sheets

CLUTCH DISK WITH CUSHIONED FRICTION ELEMENT ASSEMBLY

BACKGROUND OF THE INVENTION

This invention relates to clutch disks adapted for use in dry friction clutches. More particularly, the invention relates to means for securing friction elements to such disks.

In certain heavy duty clutch designs, there is a need to accommodate lateral deflection of friction elements which occurs during transition between clutch disengagement and full clutch engagement, referred to herein as "transitional" clutch engagement. In heavy duty clutch systems, the greatest amount of lateral deflection occurs during the transitional engagement phase.

In most prior art clutch systems, lateral deflection is typically accommodated by cushioning the spacing between friction elements positioned on opposed or opposite sides of the clutch disk. This is accomplished by adding spaces, springs, or both between opposed friction elements. Such systems, however, do not address the problem of stress in the rigid connections between the friction elements and disks. Most systems will employ spot welding for the connection, or will utilize rivets for this purpose. The stress loads on the spot welds or rivets are relatively high, causing frequent cracking within the otherwise normal useful life of the clutch. Ideally, rigid connectors are avoided at locations of high stress, such as at the interface between friction element assemblies and the clutch disks to which such assemblies are secured.

SUMMARY OF THE INVENTION

The driven clutch disk with friction element assembly disclosed herein contains a friction element-to-disk connection which does not include rivets or welds. In a preferred form, the disk includes a plurality of circumferentially and uniformly spaced openings, wherein one set of friction elements is supported over each opening. Each friction element assembly defines a pair of identical laminates opposingly joined together over one opening, each laminate positioned on an opposite face of the disk. Each laminate comprises a backing plate having one friction member rigidly secured thereto, each backing plate of each pair of laminates defining a central cushion region in an area radially coterminous with and positioned between the friction members. Each backing plate also includes a pair of laminate joinder sections at opposite radially extending ends of the cushion region, each section contiguous with one radial boundary of the cushion region. Each friction element assembly defines at each end thereof a pair of integral sliding wedge supports which clasp the disk at the radial boundaries of each opening for supporting each friction assembly without the use of rigid, fixed connectors. The sliding wedge supports provide the sole means of retention of each assembly over one disk opening, and the supports are adapted to accommodate significant lateral deflection of the laminates during transitional clutch engagement.

DETAILED DESCRIPTION OF A PREFERRED EMBODIMENT

Figure 1:
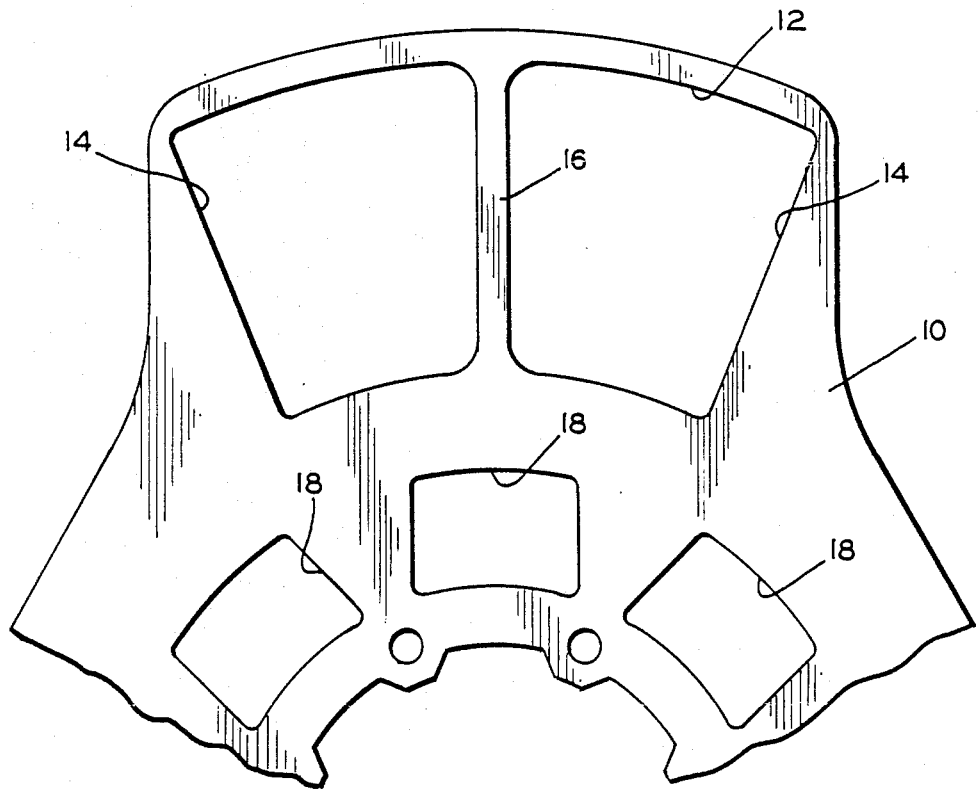
FIG. 1 is a fragmentary side view of a preferred embodiment of disk utilized in the present invention.
Figure 2:
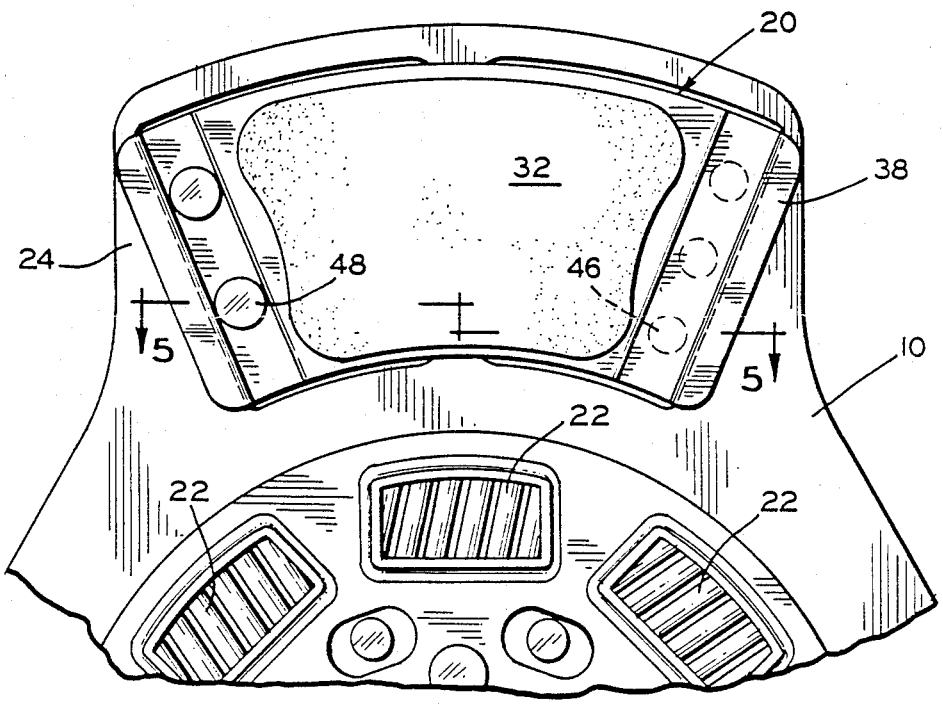
FIG. 2 is a similar fragmentary side view of a fully assembled disk which includes a preferred embodiment of one friction element assembly constructed in accordance with the present invention.

Referring initially to FIG. 1, a clutch disk 10 of the type adapted for engagement and release in a dry friction clutch system (not shown) is represented fragmentarily. The disk 10 includes a plurality of pairs of apertures or openings 12 (only one pair of which is shown) for support of a like plurality of friction element assemblies 20 (FIG. 2). Each pair of apertures 12 includes a dividing center rib 16 for purposes explained hereinbelow. In addition, the disk 10 includes a plurality of annularly arranged damper spring apertures 18 for support of damper springs 22 (FIG. 2).

Referring to FIG. 2, a fully assembled clutch disk 10, again shown fragmentarily, includes a plurality of radially extending arms 24 (only one of which is shown), each of which supports a friction element assembly 20 over the pair of apertures 12 shown in FIG. 1. Each pair of apertures 12 defines a pair of circumferentially spaced radially extending boundaries 14. Each boundary 14 in a preferred form is equidistant from the radially extending center rib 16.

Figure 3:
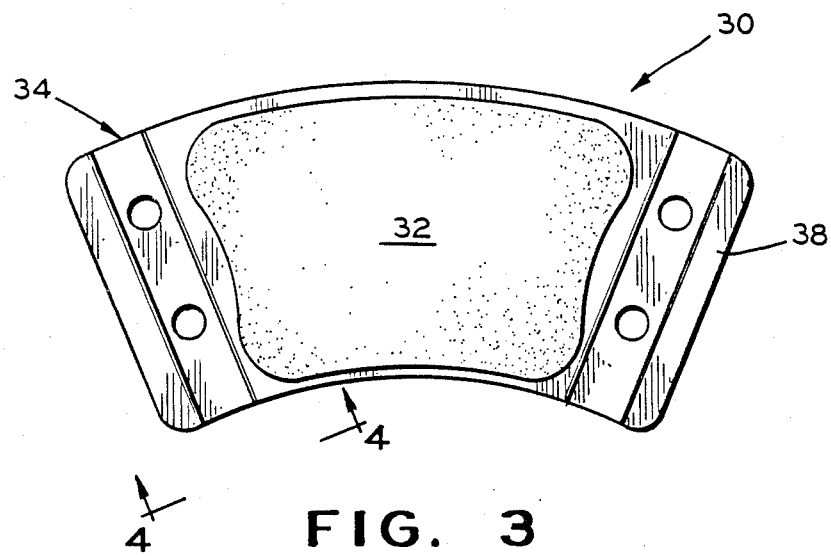
FIG. 3 is one friction laminate of the type utilized to form the friction element assembly of the present invention.
Figure 4:
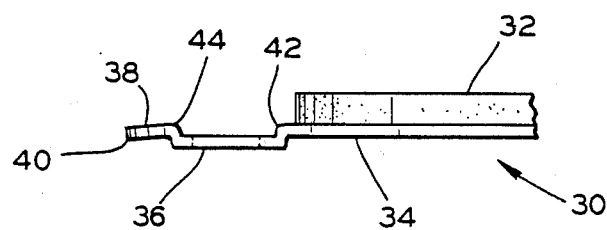
FIG. 4 is a view along lines 4—4 of FIG. 3.
Figure 5:
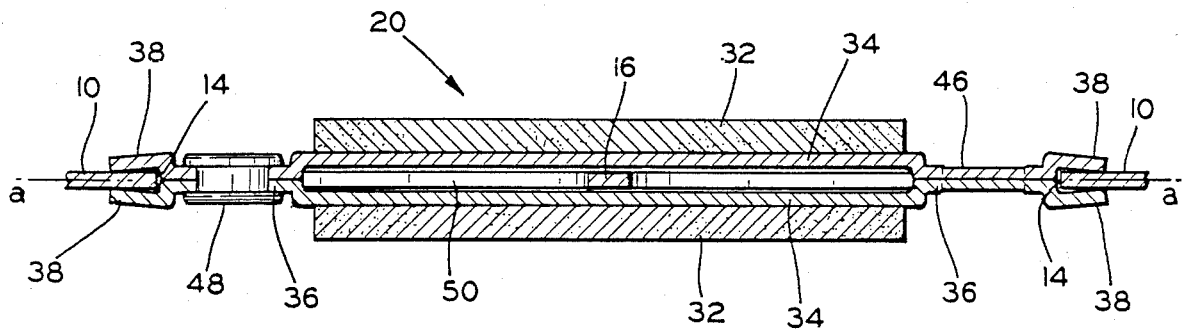
FIG. 5 is a view along lines 5—5 of FIG. 2.

Each friction element assembly 20 (FIG. 2) is made up of a pair of friction laminates 30 as shown in particular detail in FIGS. 3 and 4. Each laminate includes a friction member 32 bonded to a backing plate 34. Referring momentarily to FIG. 5, the pair of backing plates 34 of each friction element assembly 20 are joined together at laminate joinder sections 36. The joinder sections 36 are coupled together by either spot welds as shown at 46 of FIG. 5 or by rivet connection as shown at 48 of FIG. 5. (Both coupling methods are shown in the same Figure for convenience only. Typically, only one coupling method would be utilized.)

Each laminate includes an integral sliding wedge support 38, which extends outwardly of each joinder section 36. Each joinder section 36 (FIG. 4) is laterally off-set from both the portion of the backing plate 34 underlying the friction member 32 as well as from the sliding wedge support 38. Elbows 42 and 44 join the respective sections together as shown. Each sliding wedge support 38 makes a contact with the disk 10 at a contact interface 40.

Referring particularly to FIG. 3, those skilled in the art will appreciate that the contact established between the interface 40 and the disk will define a line, not a point, and that the sole means of support for the friction element assembly 20 will be provided by the clasping action of two pairs of sliding wedge supports 38 at opposite ends of the assembly 20 (FIG. 5). In the preferred form, the contact interface 40 will be under a slight compression load for alleviating any risk of noncontact resulting from manufacturing tolerances.

Continuing reference to FIG. 5, a central cushion region 50 is positioned between the portions of the assembled backing plates 34 underneath the friction members 32. This region defines a space which provides a "cushioned effect" adapted to absorb lateral deflections associated with transitional clutch engagements.

In the preferred embodiment as shown, the rib 16 will act to limit deflection of the individual backing plate portions 34 which underlie the friction members 32 during transitional clutch engagement. It is envisioned, however, that the present invention is not limited to the inclusion of such a rib 16. Also, in the preferred embodiment as herein described, the sliding wedge supports 38 will extend at a slight acute angle with respect to the axis "a—a" of the disk 10. This angle will preferably lie within a range of 1 to 5 degrees to ensure a line rather than surface contact, regardless of the amount of lateral deflection of the disk 10.

Although only one preferred embodiment is shown and described herein, the appended claims are envisioned to cover additional embodiments, neither shown nor described, which fall within the spirit and scope thereof.

What is claimed is:

1. A clutch disk assembly adapted for engagement and release in a friction clutch, said assembly comprising an annular disk having an opening, said opening having radially extending boundaries, said disk assembly further comprising a pair of friction elements positioned on opposed sides of said disk over said opening, said elements secured to one another through said opening, said elements each including a pair of elbows and a cooperative pair of opposed sliding wedge supports, each support depending from one elbow, each support adapted for engagement of said disc, each pair of opposed sliding wedge supports extending circumferentially beyond opposed sides of said boundaries of said opening, each individual opposed support extending angularly inwardly, from said one elbow from which said support depends, toward said clutch disc, each opposed support establishing a line contact with said disc, wherein said cooperative pairs of sliding supports provide the sole support means of said friction elements with respect to said disk, whereby under conditions of lateral deflection of said friction elements, said supports slide over the radially extending boundaries of said opening.

2. The clutch disk assembly of claim 1 wherein said pair of opposed friction elements comprises a central cushion region defined by a radially extending space between said pair of friction elements.

3. In a driven clutch disk assembly adapted for engagement and release in a dry friction clutch, said disk assembly comprising an annular disk having a plurality of circumferentially and uniformly spaced openings, wherein a friction element assembly is supported over each opening; an improvement comprising: at least one friction element assembly defining a pair of identical laminators opposingly joined together over one of said openings on opposite sides of said disk, each laminate comprising a backing plate and a friction member rigidly secured thereto, the backing plate of each pair of laminates opposed to the other backing plate and defining a central cushion region between said friction members, each backing plate further defining a pair of laminate joinder sections positioned on circumferentially spaced sides of said cushion region, each friction assembly having a pair of elbows and a radially extending pair of sliding wedge supports on opposed ends of each laminate, each wedge support depending from one elbow, each wedge support cooperating with one support on the opposite of said pair of laminates to jointly clasp said disk for support of said friction assembly, each pair of opposed sliding wedge supports extending circumferentially beyond opposed sides of said opening, each individual opposed support extending angularly inwardly, from said one elbow from which said support depends, toward said clutch disc, each opposed support establishing a line contact with said discs, wherein said supports slidably engage said disk under conditions of lateral deflection of said laminate assembly during transitional clutch engagement.

4. The clutch disk assembly of claim 3 wherein each one of said opposed pairs of backing plates of each friction laminate assembly has opposed first and second sides, wherein the first sides of the plates are joined together, wherein said central cushion region is positioned in a region between said first sides, and wherein one of said friction members is bonded to the second side of each backing plate.

5. The clutch disk assembly of claim 4 wherein said pairs of laminates of each laminate assembly are in contact with one another only at their joinder sections.

6. The clutch disk assembly of claim 5 wherein said pairs of sliding wedge supports are integral with said joinder sections at said opposed ends of each laminate.

7. The clutch disk assembly of claim 6 wherein said wedge supports extend circumferentially and have radially aligned boundaries.

8. The clutch disk assembly of claim 7 wherein said wedge supports extend angularly inwardly in a range of one to five degrees with respect to a radial plane through said clutch disk.

9. The clutch disk assembly of claim 8 further comprising means for limiting lateral deflection of said laminates wherein each opening defines a central radially extending rib.

10. The clutch disk assembly of claim 9 wherein said joinder sections lie in said radial plane through said clutch disk.

11. The driven clutch disk assembly of claim 3 wherein each joinder section of each laminate is contiguous with one radial boundary of said cushion region.

12. A friction element laminate comprising a backing plate and a friction member secured to the backing plate, the backing plate defining a pair of joinder sections spaced apart on opposed sides of said friction member, said laminate further defining a pair of elbows and a pair of wedge supports, each wedge support depending from one elbow, said pair of wedge supports defining opposing ends of said laminate outwardly of said joinder sections, said joinder sections being laterally off-set by said elbows from said wedge supports, said wedge supports being angularly oriented in a range of one to five degrees with respect to said joinder sections, each of said joinder sections being positioned intermediately of said friction member and one of said wedge supports.

* * * * *